US012739205B2

(12) United States Patent
Panigrahi et al.

(10) Patent No.: US 12,739,205 B2
(45) Date of Patent: Sep. 15, 2026

(54) FLOW-SPECIFIC CONGESTION HANDLING

(71) Applicant: Nokia Technologies Oy, Espoo (FI)

(72) Inventors: Bighnaraj Panigrahi, Bangalore (IN); Saubhagya Baliarsingh, Bengaluru (IN); Jisha George, Bangalore (IN); Deepa Malapati Ravindraiah, Bangalore (IN); Devaki Chandramouli, Plano, TX (US); Ece Goshi, Munich (DE); Parthasarathi Ravindran, Bengaluru (IN)

(73) Assignee: Nokia Technologies Oy, Espoo (FI)

( * ) Notice: Subject to any disclaimer, the term of this patent is extended or adjusted under 35 U.S.C. 154(b) by 95 days.

(21) Appl. No.: 18/783,533

(22) Filed: Jul. 25, 2024

(65) Prior Publication Data

US 2025/0039092 A1 Jan. 30, 2025

(30) Foreign Application Priority Data

Jul. 28, 2023 (IN) ............................ 202341051069

(51) Int. Cl.
*H04L 47/11* (2022.01)
*H04L 47/122* (2022.01)

(52) U.S. Cl.
CPC ............ *H04L 47/11* (2013.01); *H04L 47/122* (2013.01)

(58) Field of Classification Search
CPC ...................................................... H04L 47/11
USPC ........................................................ 709/238
See application file for complete search history.

(56) References Cited

U.S. PATENT DOCUMENTS

2017/0272372 A1* 9/2017 Gafni ...................... H04L 47/32
2021/0203606 A1* 7/2021 Burroughs .............. H04L 47/11
2023/0198910 A1* 6/2023 Tourrilhes ............. H04L 47/215
2024/0031295 A1* 1/2024 Bharadwaj ............ G06F 3/0659
2026/0005973 A1* 1/2026 Haddad ................... H04L 47/31

FOREIGN PATENT DOCUMENTS

WO WO-2023048629 A1 * 3/2023 ........ H04W 28/0284

* cited by examiner

*Primary Examiner* — Ario Etienne
*Assistant Examiner* — Kidest Mendaye
(74) *Attorney, Agent, or Firm* — Robert P. Michal, Esq.; Rimon PC

(57) ABSTRACT

There are provided measures for flow-specific congestion handling. Such measures may include deciding, for a first congestion notification marking enabled traffic flow, parameter information for modifying a congestion notification marking rate to be applied to said first congestion notification marking enabled traffic flow, and transmitting, towards a network entity, a message including said parameter information.

1 Claim, 10 Drawing Sheets

FLOW-SPECIFIC CONGESTION HANDLING

TECHNICAL FIELD

Various example embodiments of this subject disclosure generally relate to flow-specific congestion handling. More specifically, the various example embodiments relate to measures (including methods, apparatuses and computer program products) for realizing flow-specific congestion handling.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards (such as, those provided by 3GPP), satellite based communication systems and different wireless local networks. A wireless local network may, for example, be implemented as a wireless local area network (WLAN). The wireless systems can typically be divided into cells, and are therefore often referred to as cellular systems.

The communication system and associated devices typically operate in accordance with a given standard or specification which sets forth what the various entities associated with the system are permitted to do and how that should be achieved. Communication protocols and/or parameters which shall be used for the connection are also typically defined. An example of a set of standards are the so-called 5G standards.

SUMMARY

Various example embodiments aim at addressing at least part of the issues and/or problems and drawbacks either explicitly described herein or otherwise apparent to a person skilled in the relevant arts in view of the subject disclosure.

Several aspects of the various example embodiments are detailed as follows.

According to an aspect, there is provided a method, comprising deciding, for a first congestion notification marking enabled traffic flow, parameter information for modifying a congestion notification marking rate to be applied to said first congestion notification marking enabled traffic flow, and transmitting, towards a network entity, a message including said parameter information.

According to an aspect, there is provided a method, comprising receiving, from an application function entity, a first message including parameter information for modifying a congestion notification marking rate to be applied to a first congestion notification marking enabled traffic flow, and transmitting, towards a congestion notification marking responsible entity, a second message including said parameter information.

According to an aspect, there is provided a method, comprising receiving, from a network entity, a message including parameter information for modifying a congestion notification marking rate to be applied to a first congestion notification marking enabled traffic flow, detecting packet queue delay information related to said first congestion notification marking enabled traffic flow indicative of a congestion level, and determining said congestion notification marking rate to be applied to said first congestion notification marking enabled traffic flow based on said packet queue delay information, a general congestion notification marking rule, and said parameter information.

According to an aspect, there is provided an apparatus, comprising deciding circuitry configured to decide, for a first congestion notification marking enabled traffic flow, parameter information for modifying a congestion notification marking rate to be applied to said first congestion notification marking enabled traffic flow, and transmitting circuitry configured to transmit, towards a network entity, a message including said parameter information.

According to an aspect, there is provided an apparatus, comprising receiving circuitry configured to receive, from an application function entity, a first message including parameter information for modifying a congestion notification marking rate to be applied to a first congestion notification marking enabled traffic flow, and transmitting circuitry configured to transmit, towards a congestion notification marking responsible entity, a second message including said parameter information.

According to an aspect, there is provided an apparatus, comprising receiving circuitry configured to receive, from a network entity, a message including parameter information for modifying a congestion notification marking rate to be applied to a first congestion notification marking enabled traffic flow, detecting circuitry configured to detect packet queue delay information related to said first congestion notification marking enabled traffic flow indicative of a congestion level, and determining circuitry configured to determine said congestion notification marking rate to be applied to said first congestion notification marking enabled traffic flow based on said packet queue delay information, a general congestion notification marking rule, and said parameter information.

According to an aspect, there is provided an apparatus, comprising at least one processor, at least one memory including computer program code, and at least one interface configured for communication with at least another apparatus, the at least one processor, with the at least one memory and the computer program code, being configured to cause the apparatus to perform deciding, for a first congestion notification marking enabled traffic flow, parameter information for modifying a congestion notification marking rate to be applied to said first congestion notification marking enabled traffic flow, and transmitting, towards a network entity, a message including said parameter information.

According to an aspect, there is provided an apparatus, comprising at least one processor, at least one memory including computer program code, and at least one interface configured for communication with at least another apparatus, the at least one processor, with the at least one memory and the computer program code, being configured to cause the apparatus to perform receiving, from an application function entity, a first message including parameter information for modifying a congestion notification marking rate to be applied to a first congestion notification marking enabled traffic flow, and transmitting, towards a congestion notification marking responsible entity, a second message including said parameter information.

According to an aspect, there is provided an apparatus, comprising at least one processor, at least one memory including computer program code, and at least one interface configured for communication with at least another apparatus, the at least one processor, with the at least one memory and the computer program code, being configured to cause the apparatus to perform receiving, from a network entity, a message including parameter information for modifying a congestion notification marking rate to be applied to a first congestion notification marking enabled traffic flow, detecting packet queue delay information related to said first congestion notification marking enabled traffic flow indicative of a congestion level, and determining said congestion notification marking rate to be applied to said first congestion notification marking enabled traffic flow based on said packet queue delay information, a general congestion notification marking rule, and said parameter information.

According to an aspect, there is provided a computer program product comprising computer-executable computer program code which, when the program is run on a computer (e.g. a computer of an apparatus according to any one of the aforementioned apparatus-related aspects of the subject disclosure), is configured to cause the computer to carry out the method according to any one of the aforementioned method-related aspects of the subject disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects or other aspects described herein facilitates an optimized provision and exploitation of congestion reduction control assistance to thereby address at least part of any issues and drawbacks identified herein or otherwise apparent to a person skilled in the relevant arts in view of the subject disclosure.

In some example embodiments, there is provided flow-specific congestion handling. More specifically, there are provided measures and mechanisms for realizing flow-specific congestion handling.

Thus, optimizations may be achieved by methods, apparatuses and computer program products enabling/realizing flow-specific congestion handling.

BRIEF DESCRIPTION OF THE DRAWINGS

In the following, some example embodiments will be described in greater detail, by way of non-limiting and illustrative examples, with reference to the accompanying drawings, in which.

DETAILED DESCRIPTION

Figure 1:
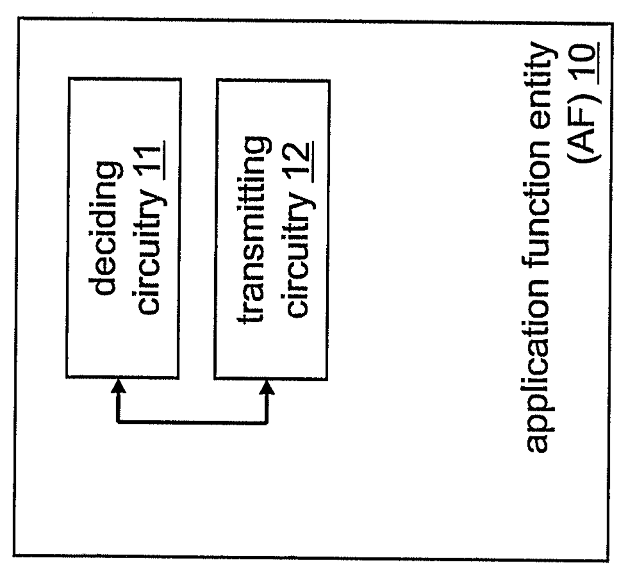
FIG. 1 is a block diagram illustrating an apparatus according to some example embodiments.

The subject disclosure is described herein with reference to particular non-limiting and illustrative examples. A person skilled in the art will appreciate that the subject disclosure is by no means limited to these examples, and may be more broadly applied.

It is to be noted that the following description of the subject disclosure and its various example embodiments refers to specifications being used as non-limiting examples for certain network configurations and deployments. Namely, the subject disclosure and its various example embodiments are described in relation to 3GPP specifications being used as non-limiting examples for certain network configurations and deployments. As such, the description of such example embodiments provided herein specifically refers to terminology which is directly related thereto. Such terminology is only used in the context of non-limiting and illustrative examples, and is not intended to limit the subject disclosure in any way. Rather, any other communication or communication related system deployment, etc. may also be utilized.

Hereinafter, various example embodiments and implementations of the subject disclosure and its aspects are described using several variants and/or alternatives. It is generally noted that, according to certain constraints, all of the described variants and/or alternatives may be provided alone or in any combination (also including combinations of individual features of the various variants and/or alternatives).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

There is provided a means configured for congestion handling and communications in relation to congestion handling. As further detailed herein, one or more issues can arise in handling congestion differently for different traffic flows that are not arranged for. Flow-specific congestion handling may provide advantages and optimizations for certain use cases.

According to some example embodiments, there are provided measures and mechanisms for (enabling/realizing) flow-specific congestion handling.

A low latency, low loss scalable throughput (L4S) service may allow network administrators to configure their routers' active queue management (AQM) to mark packets as per congestion experienced (CE) if the queueing delay threshold is exceeded.

The L4S compatible transport/higher layers could then deduce the amount of congestion by the ratio of normal versus CE-marked packets and thus could then be able to reduce the sending rate accordingly.

During normal operation, this method would completely avoid packet drops caused by congestion and retain high utilization and low latency.

The explicit congestion notification (ECN) algorithm has (only) one responsibility to inform the sender about congestion building at the routers. Hence, ECN is a congestion notification or congestion signalling algorithm. ECN informs the sender about congestion so that respective measures can be taken to avoid building congestion. ECN marking may be used for L4S traffic.

To support extended reality (XR) in $3^{rd}$ Generation Partnership Project (3GPP) networks, mechanisms were studied that enable codec/rate adaptation to meet requirements for services.

Two ways the congestion information can be conveyed back to the application (for rate adaptation) may be considered.

Option 1 (By enabling L4S): 5$^{th}$ Generation (5G) system may use ECN marking for the purpose of L4S for uplink and/or downlink quality of service (QOS) flows via one of the following two methods. A QoS flow level explicit indication may be provided to packet data unit (PDU) session anchor (PSA) user plane function (UPF) to enable the ECN marking for the purpose of L4S.

Method 1: To support L4S, next generation radio access network (NG-RAN) performs ECN marking for uplink and downlink in internet protocol (IP) layer of the received packets.

Method 2: PSA UPF performs ECN marking for uplink (UL) and downlink (DL) IP layer of the received packets based on latest reported congestion information from NG-RAN via General Packet Radio System (GPRS) tunnelling protocol user plane (GTP-U) header. When no congestion is present or congestion ends, the PSA UPF stops ECN marking.

Option 2 (via application programming interface (API) based exposure): 5G system also may support API based exposure of congestion level information towards an application function (AF).

A QoS flow may be enabled with ECN marking for L4S requirement, e.g. statically when a PDU session is established based on configuration in session management function (SMF) or policy control function (PCF), or dynamically based on detection of the L4S traffic, e.g. via ECN capable transport (ECT) and/or IP 5 tuple in the IP header, whereby SMF or PCF triggers a setup of a QoS flow enabled for L4S, or by requests by an AF.

For certain situations, the host is to distinguish L4S and classic/non-L4S traffic packets with an identifier (e.g., ECT), so that the network can classify them into their separate treatments.

An application server may provide an L4S capable (multi-) media service which may be transmitted via a single or multiple QoS flows in 5G system (5GS).

In the current scheme, when NG-RAN experiences congestion, it will decide the number/percentage of packets to be (ECN-) marked of each of the incoming QoS (L4S) traffics.

The percentage per each QoS flow may be calculated with respect to the packet in-flow rate (5G QOS identifier (5QI)/bitrate) of the particular QoS flow (e.g., flow that is pumping more packets to the network will be marked more and vice versa).

When there are multiple L4S traffic flows present in 5GS, the following issues may arise:

An AF cannot differentiate some L4S traffics from others, for example, if the AF wants some of the priority L4S traffic flows to be handled differently in terms of marking packets during congestion, or if an AF wants to update the priority handling of certain L4S traffic at run time (e.g., emergency news feed in the middle of a live news).

In some scenarios, one or more heavy (e.g., high data rate, high throughput, large size) application traffic(s) may enter into the 5GS and may cause the 5G network to become congested. If an AF wants to put a higher marking probability for these heavily injecting flows than for the flows for which regular marking (as per their 5QI or packet error rate (PER) or packet inject rate), this is not possible with present mechanisms.

In some scenarios, the impacting L4S traffic flows may belong to the same user equipment (UE) (e.g., one QoS flow for audio vs. one QoS flow for video for the same PDU session). When congestion happens, if AF wants to give priority (e.g. less marking) to video compared to audio, for marking (but as per 5QI or ARP or packet inject rate video should get higher markings, otherwise), this is not possible with present mechanisms.

In some scenarios, the QoS flows may belong to different UEs (assuming both UEs are served under same RAN/UPF), and hence may need to be dealt differently (e.g., one UE is a priority UE/subscriber and hence the packet marking may be desired to be different—even after using ARQ/5QI).

The UE/subscriber may demand and choose the quality of streaming video by selecting "best quality" vs. "best effort" streaming. Here "best quality" indicates that the user sets priority on best video quality, while packet drops or stops would not annoy/concern. On the other hand, "best effort" indicates continuous steaming (without gaps) without worrying about video quality. With present L4S mechanisms, this differentiation cannot be provided.

Such a chaotic scenario (multiple L4S application flows impacting one another) may last and/or happen during a certain time period. If any changes/measures were taken during this time period and not reverted back, it may cause non-optimal conditions to the application flows and to the network.

Hence, a way is searched for, by which an AF, for fairness or any other reason, can provide some control assistance to the RAN for handling the ECN marking percentage for certain L4S traffic flows differently.

Some example embodiments begin from the concept that an AF may be the right candidate that can anticipate and try to provide fairness among L4S application traffic types.

Hence, according to some example embodiments, the AF anticipates and tries to provide fairness among L4S application traffic types by observing the type of application, number of such L4S type application traffic flows that are sent via the 3GPP network at any point in time, any specific difference (e.g. characteristic) for such type of applications, expected duration of such scenario (multiple applications at same time), etc.

According to some example embodiments, the AF understands the characteristics of different application types (e.g., the L4S type application flows).

Therefore, according to some example embodiments, the AF indicates to 5G core (5GC) a "sensitivity parameter" (parameter information) per L4S type traffic flow. The sensitivity parameter (or just "sensitivity") can be a multiplier value (e.g., 1/2 or 1/3, etc.) or a percentage value (e.g., 50%, 30%, etc.).

According to some example embodiments, this sensitivity parameter shall help the intermediate L4S nodes (NG-RAN) who may perform the ECN markings, to customize (e.g., increase or decrease) the ECN markings (e.g., percentage of packets to be marked) accordingly.

For example, for 40% congestion level, the RAN is marking X % of packets of a specific L4S QoS flow (e.g. application service F1). If the sensitivity of F1 is (set to) 90%, then the 5GC node may increase the marking percentage to 2*X % or 3*X % (so that the sender host/application shall reduce the data rate significantly). If the sensitivity of the flow F1 is (set to) 10%, then the marking may be kept same as X % or reduced to 0.5*X % (in case marking percent is reduced for some traffic flows, it may need to be increased for some other traffic flows, as RAN may decide to reduce overall certain level of inflow of packets in various flows).

According to some example embodiments, the exact correlation between the sensitivity to the congestion level and marking percentage may be implementation specific.

In a simplistic (implementation) case, the sensitivity may also be categorized into either a high, medium or low indication (per application flow or Qos flow) instead of being a multiplier value or a percentage value.

According to some example embodiments, the maximum RAN marking percentage shall be decided by RAN. The sensitivity parameter will be aligned to the range of RAN marking percentage.

According to some example embodiments, multiple flows (belonging to the same UE) may be identified by a common ID for co-relation.

According to further example embodiments, the AF defines and indicates a time window for the sensitivity indication.

The sensitivity of that flow is valid till the specified time period expires. According to some example embodiments, after expiry of the given time period, the 5GC removes the sensitivity constraint and operates in normal mode (e.g., no sensitivity-based differential marking/treatment), unless the AF sends/updates with new sensitivity and time window.

According to some example embodiments, sensitivity parameters are provided as a list of marking percentages (or other multiplier values or categories) each of which is associated with a congestion value/range and/or a congestion interval.

An example sensitivity information parameter list may be as follows:

{sensitivity X1, trigger condition: congestion level above Y1% or between Y1% and Y2%}, {sensitivity X2, trigger condition: congestion level above Y2% or between Y2% and Y3%}.

According to further example embodiments, the AF dynamically changes the sensitivity of a traffic flow, and indicates the same to 5GC mid session (i.e., after the application traffic flow has started). This may depend on the number of such flows entering the system or depend on the congestion behavior of the network—either by getting direct congestion report or UL/DL/roundtrip delay information from 5GC.

According to example embodiments, the AF may send an updated time window before/after the current window expires.

Such control may be applied for one or more QoS flows or PDU sessions belonging to the same UE. According to some example embodiments, multiple flows (belonging to the same UE) are identified by a common ID for co-relation.

According to some example embodiments, the UE may have selected a specific option for L4S sensitivity and informs the application/AF thereof. For example, while watching streaming video, a user may select “best quality” vs. “best effort” streaming, as discussed above. Accordingly, in some example embodiments, the AF may apply the sensitivity index/parameter as per the user’s demand. In other words, “best quality” will have a lower sensitivity so that network would not apply L4S marking vigorously upon congestion; rather, it may drop packets. Similarly, in case of “best effort”, sensitivity would be higher, which will cause vigorous L4S markings and that will cause application to control the flow rate.

According to still further example embodiments, multiple UE scenarios are considered. For instance, one or more QoS flows belonging to one or more UEs may flow through the same RAN and or UPF. In such case, according to some example embodiments, the sensitivity may be applied to further distribute the marking across UE(s) depending on the application.

According to further example embodiments, if application layer forward error correction (AL-FEC) is enabled for the L4S traffic flows, then any assistant information from AF or characteristics of AL-FEC are taken into account while deciding the sensitivity parameter for that flow. This is because with AL-FEC enabled, the traffic flow and rate may change further due to redundancy.

Several example embodiments are specified below in more detail.

Figure 6:
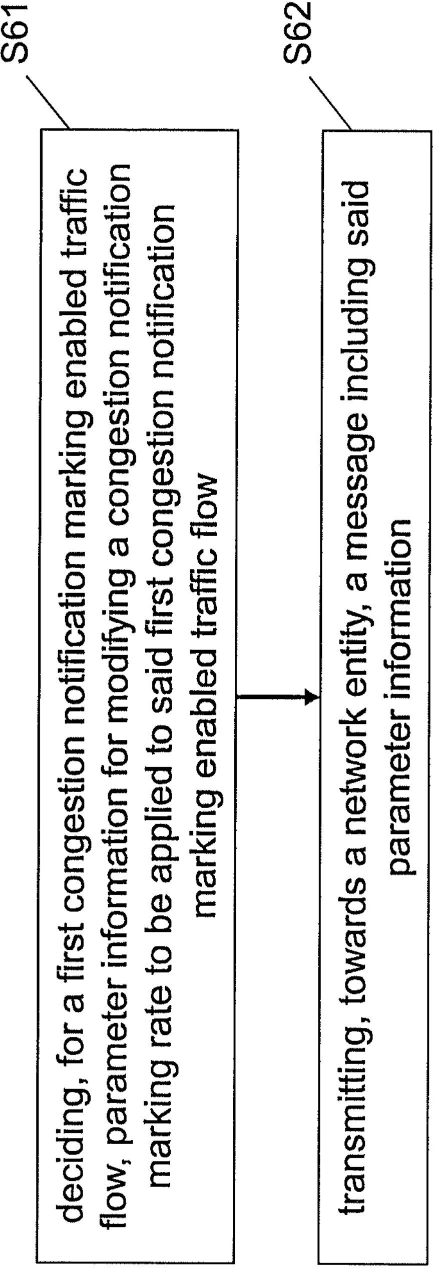
FIG. 6 is a schematic diagram of a procedure according to some example embodiments.

FIG. 1 is a block diagram illustrating an apparatus according to some example embodiments. The apparatus may be a network node or entity 10, such as an application function entity (e.g. AF), comprising a deciding circuitry 11 and a transmitting circuitry 12. The deciding circuitry 11 decides, for a first congestion notification marking enabled traffic flow, parameter information for modifying a congestion notification marking rate to be applied to said first congestion notification marking enabled traffic flow. The transmitting circuitry 12 transmits, towards a network entity, a message including said parameter information. FIG. 6 is a schematic diagram of a procedure according to some example embodiments. The apparatus according to FIG. 1 may perform the method of FIG. 6 but is not limited to this method. The method of FIG. 6 may be performed by the apparatus of FIG. 1 but is not limited to being performed by this apparatus.

As shown in FIG. 6, a procedure according to some example embodiments comprises an operation of deciding (S61), for a first congestion notification marking enabled traffic flow, parameter information for modifying a congestion notification marking rate to be applied to said first congestion notification marking enabled traffic flow, and an operation of transmitting (S62), towards a network entity, a message including said parameter information.

Figure 2:
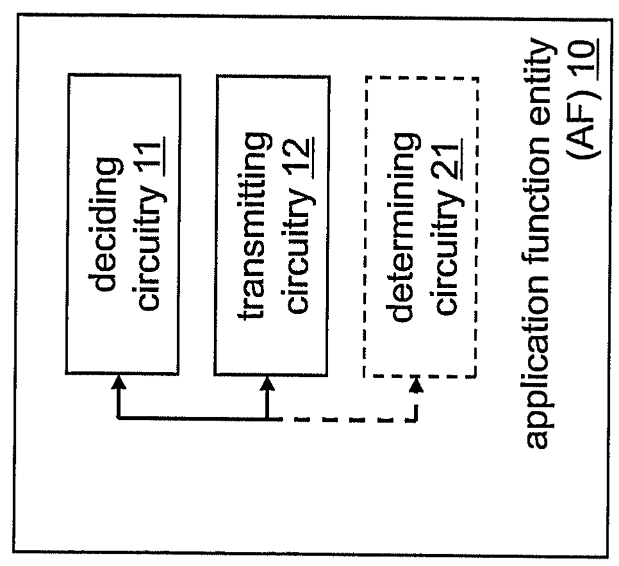
FIG. 2 is a block diagram illustrating an apparatus according to some example embodiments.

FIG. 2 is a block diagram illustrating an apparatus according to some example embodiments. In particular, FIG. 2 illustrates a variation of the apparatus shown in FIG. 1. The apparatus according to FIG. 2 may thus further comprise a determining circuitry 21.

In an example embodiment, at least some of the functionalities of the apparatus shown in FIG. 1 (or FIG. 2) may be shared between two physically separate devices forming one operational entity. Therefore, the apparatus may be seen to depict the operational entity comprising one or more physically separate devices for executing at least some of the described processes.

According to a variation of the procedure shown in FIG. 6, details of the deciding operation (S61) are provided, which are inherently independent from each other as such. Such deciding operation (S61) according to some example embodiments may comprise an operation of determining said parameter information based on at least one of the following:

an application type of an application causing said first congestion notification marking enabled traffic flow, a characteristic of said application causing said first congestion notification marking enabled traffic flow, a number of congestion notification marking enabled traffic flows, including said first congestion notification marking enabled traffic flow, existing at the same time, an expected duration of a present congestion notification marking enabled traffic flow existence scenario, a user selection in relation to said application causing said first congestion notification marking enabled traffic flow, or application layer forward error correction related information.

According to further example embodiments, said message includes validity time information associated with said parameter information, said validity time information being indicative of a validity time of said parameter information.

According to further example embodiments, said parameter information includes multiplier information or percentage information.

According to further example embodiments, said parameter information includes congestion level information (i.e., category information according to categorization, e.g., "low", "medium", "high").

According to further example embodiments, said parameter information includes a list of parameter information elements, each parameter information element of said list being associated with a respective congestion level condition.

According to further example embodiments, at least two congestion notification marking enabled traffic flows, including said first congestion notification marking enabled traffic flow, related to a terminal are identified with a single identifier, and said message includes said single identifier associated with said parameter information.

According to further example embodiments, said message is an update message configured to update said parameter information for said first congestion notification marking enabled traffic flow.

Figure 3:
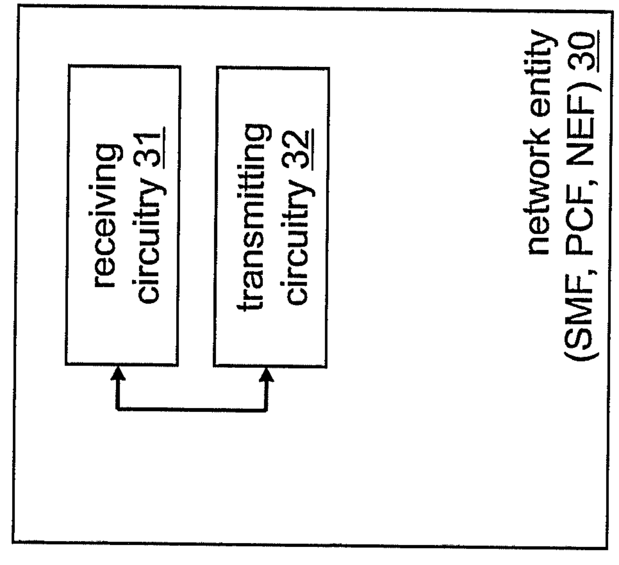
FIG. 3 is a block diagram illustrating an apparatus according to some example embodiments.
Figure 7:
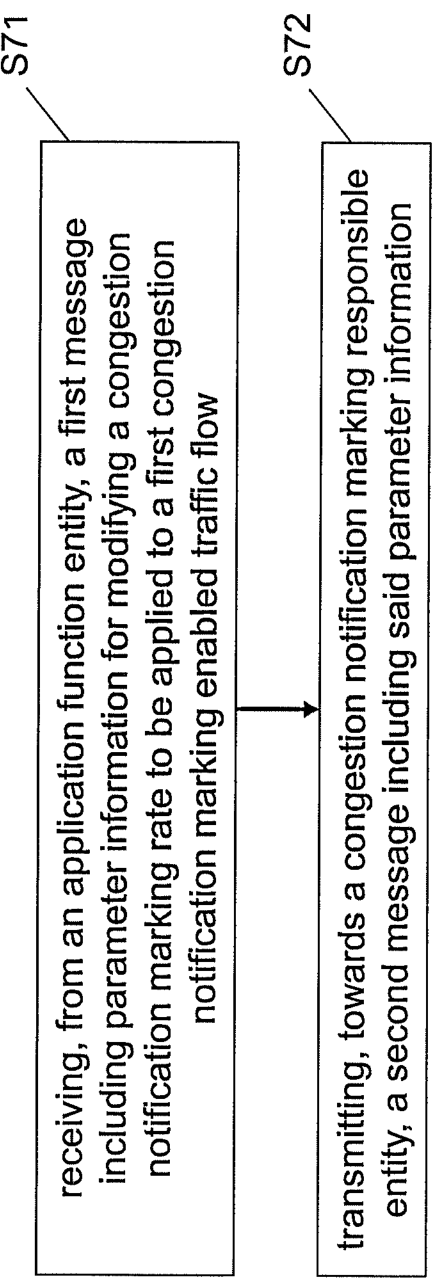
FIG. 7 is a schematic diagram of a procedure according to some example embodiments.

FIG. 3 is a block diagram illustrating an apparatus according to some example embodiments. The apparatus may be a network node or entity 30 (e.g., SMF, PCF, NEF) comprising a receiving circuitry 31 and a transmitting circuitry 32. The receiving circuitry 31 receives, from an application function entity, a first message including parameter information for modifying a congestion notification marking rate to be applied to a first congestion notification marking enabled traffic flow. The transmitting circuitry 32 transmits, towards a congestion notification marking responsible entity, a second message including said parameter information. FIG. 7 is a schematic diagram of a procedure according to some example embodiments. The apparatus according to FIG. 3 may perform the method of FIG. 7 but is not limited to this method. The method of FIG. 7 may be performed by the apparatus of FIG. 3 but is not limited to being performed by this apparatus.

As shown in FIG. 7, a procedure according to some example embodiments comprises an operation of receiving (S71), from an application function entity, a first message including parameter information for modifying a congestion notification marking rate to be applied to a first congestion notification marking enabled traffic flow, and an operation of transmitting (S72), towards a congestion notification marking responsible entity, a second message including said parameter information.

Said second message may equal said first message.

In an example embodiment, at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to further example embodiments, said first message includes validity time information associated with said parameter information, said validity time information being indicative of a validity time of said parameter information, and said second message includes said validity time information associated with said parameter information.

According to further example embodiments, said parameter information includes multiplier information or percentage information.

According to further example embodiments, said parameter information includes congestion level information (i.e., category information according to categorization, e.g., "low", "medium", "high").

According to further example embodiments, said parameter information includes a list of parameter information elements, each parameter information element of said list being associated with a respective congestion level condition.

According to further example embodiments, at least two congestion notification marking enabled traffic flows, including said first congestion notification marking enabled traffic flow, related to a terminal are identified with a single identifier, said first message includes said single identifier associated with said parameter information, and said second message includes said single identifier associated with said parameter information.

According to further example embodiments, said first message is an update message configured to update said parameter information for said first congestion notification marking enabled traffic flow.

Figure 4:
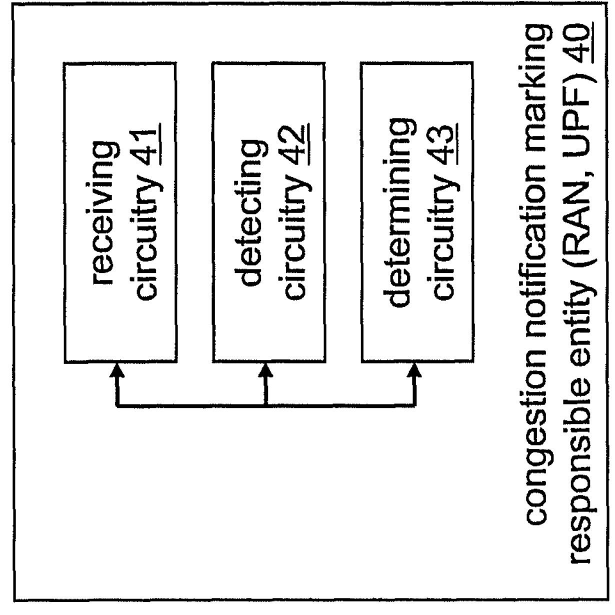
FIG. 4 is a block diagram illustrating an apparatus according to some example embodiments.
Figure 8:
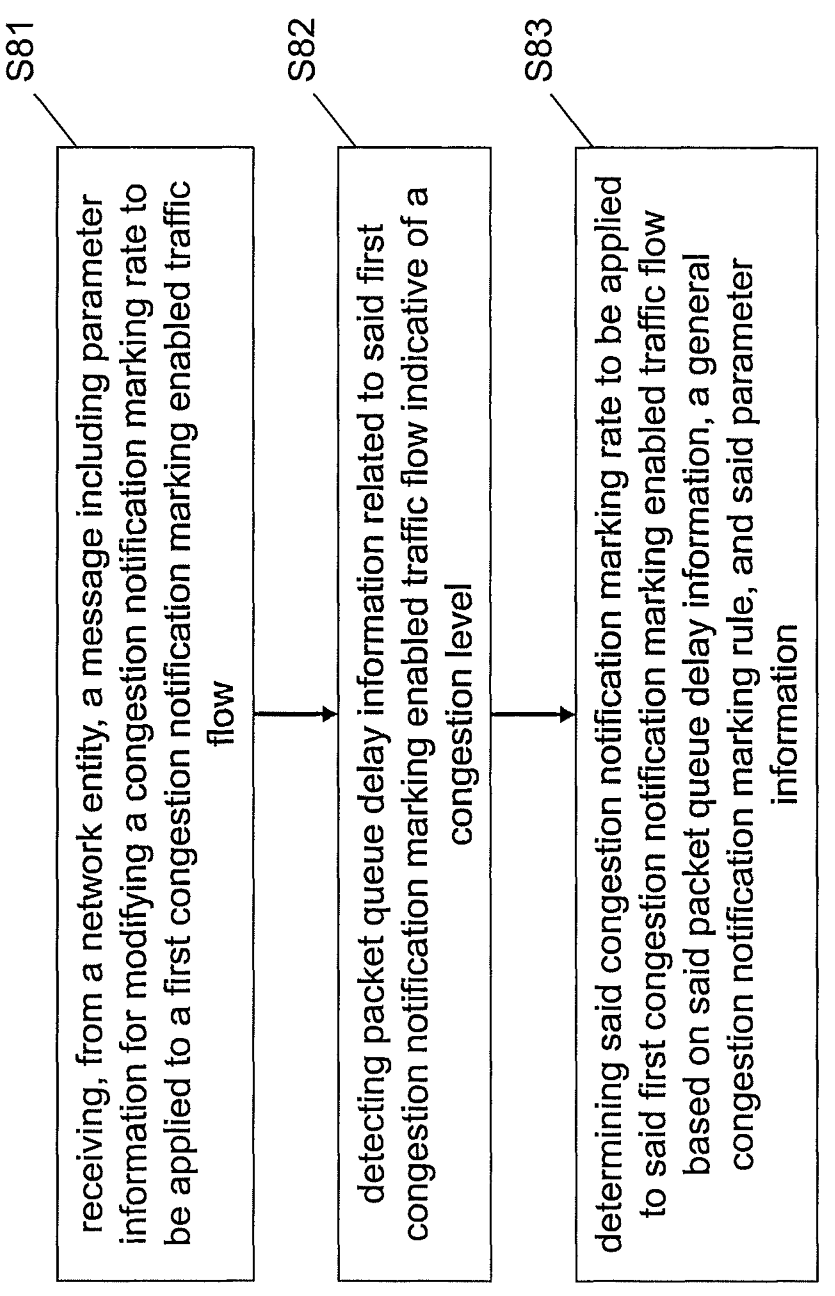
FIG. 8 is a schematic diagram of a procedure according to some example embodiments.

FIG. 4 is a block diagram illustrating an apparatus according to some example embodiments. The apparatus may be a network node or entity 40, such as a congestion notification marking responsible entity (e.g. RAN, UPF), comprising a receiving circuitry 41, a detecting circuitry 42, and a determining circuitry 43. The receiving circuitry 41 receives, from a network entity, a message including parameter information for modifying a congestion notification marking rate to be applied to a first congestion notification marking enabled traffic flow. The detecting circuitry 42 detects packet queue delay information related to said first congestion notification marking enabled traffic flow indicative of a congestion level. The determining circuitry 43 determines said congestion notification marking rate to be applied to said first congestion notification marking enabled traffic flow based on said packet queue delay information, a general congestion notification marking rule, and said parameter information. FIG. 8 is a schematic diagram of a procedure according to some example embodiments. The apparatus according to FIG. 4 may perform the method of FIG. 8 but is not limited to this method. The method of FIG. 8 may be performed by the apparatus of FIG. 4 but is not limited to being performed by this apparatus.

As shown in FIG. 8, a procedure according to some example embodiments comprises an operation of receiving (S81), from a network entity, a message including parameter information for modifying a congestion notification marking rate to be applied to a first congestion notification marking enabled traffic flow, an operation of detecting (S82) packet queue delay information related to said first congestion notification marking enabled traffic flow indicative of a congestion level, and an operation of determining (S83) said congestion notification marking rate to be applied to said first congestion notification marking enabled traffic flow based on said packet queue delay information, a general congestion notification marking rule, and said parameter information.

Figure 5:
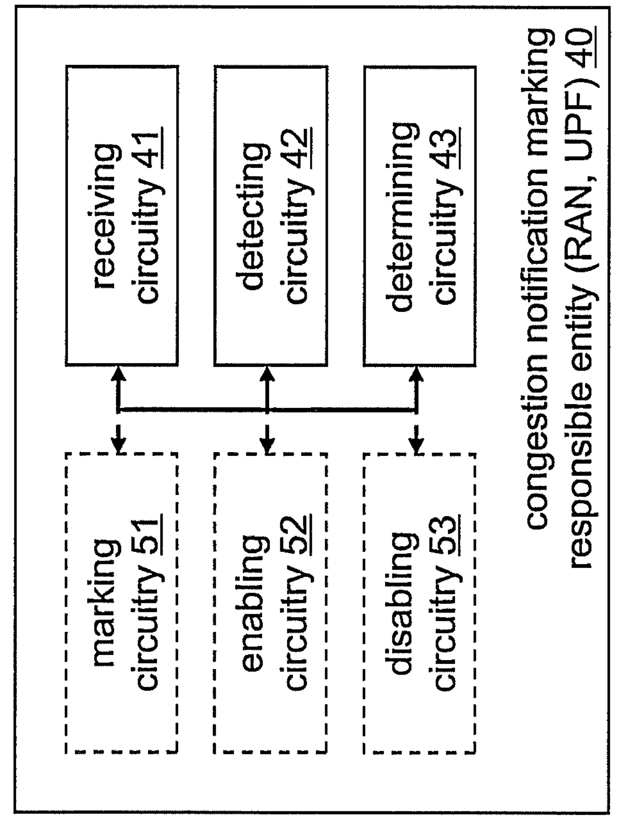
FIG. 5 is a block diagram illustrating an apparatus according to some example embodiments.

FIG. 5 is a block diagram illustrating an apparatus according to some example embodiments. In particular, FIG. 5 illustrates a variation of the apparatus shown in FIG. 4. The apparatus according to FIG. 5 may thus further comprise a marking circuitry 51, an enabling circuitry 52, and/or a disabling circuitry 53.

In an example embodiment, at least some of the functionalities of the apparatus shown in FIG. 4 (or FIG. 5) may be shared between two physically separate devices forming one operational entity. Therefore, the apparatus may be seen to depict the operational entity comprising one or more physically separate devices for executing at least some of the described processes.

According to a variation of the procedure shown in FIG. 8, additional operations are provided, which are inherently independent from each other as such. According to such variation, a method according to some example embodiments may comprise an operation of marking packets of said first congestion notification marking enabled traffic flow based on said congestion notification marking rate to be applied to said first congestion notification marking enabled traffic flow.

According to a variation of the procedure shown in FIG. 8, details of the determining operation (S83) are provided, which are inherently independent from each other as such. According to such variation, said message includes validity time information associated with said parameter information, said validity time information being indicative of a validity time of said parameter information, and such determining operation (S83) according to some example embodiments may comprise an operation of enabling consideration of said parameter information, if said parameter information is valid at a current time, and an operation of disabling consideration of said parameter information, if said parameter information is not valid at said current time.

According to further example embodiments, said parameter information includes multiplier information or percentage information.

According to further example embodiments, said parameter information includes congestion level information (i.e., category information according to categorization, e.g., "low", "medium", "high").

According to further example embodiments, said parameter information includes a list of parameter information elements, each parameter information element of said list being associated with a respective congestion level condition.

According to further example embodiments, at least two congestion notification marking enabled traffic flows, including said first congestion notification marking enabled traffic flow, related to a terminal are identified with a single identifier, and said message includes said single identifier associated with said parameter information.

Several example embodiments outlined and specified above are explained below in more specific terms.

Figure 9:
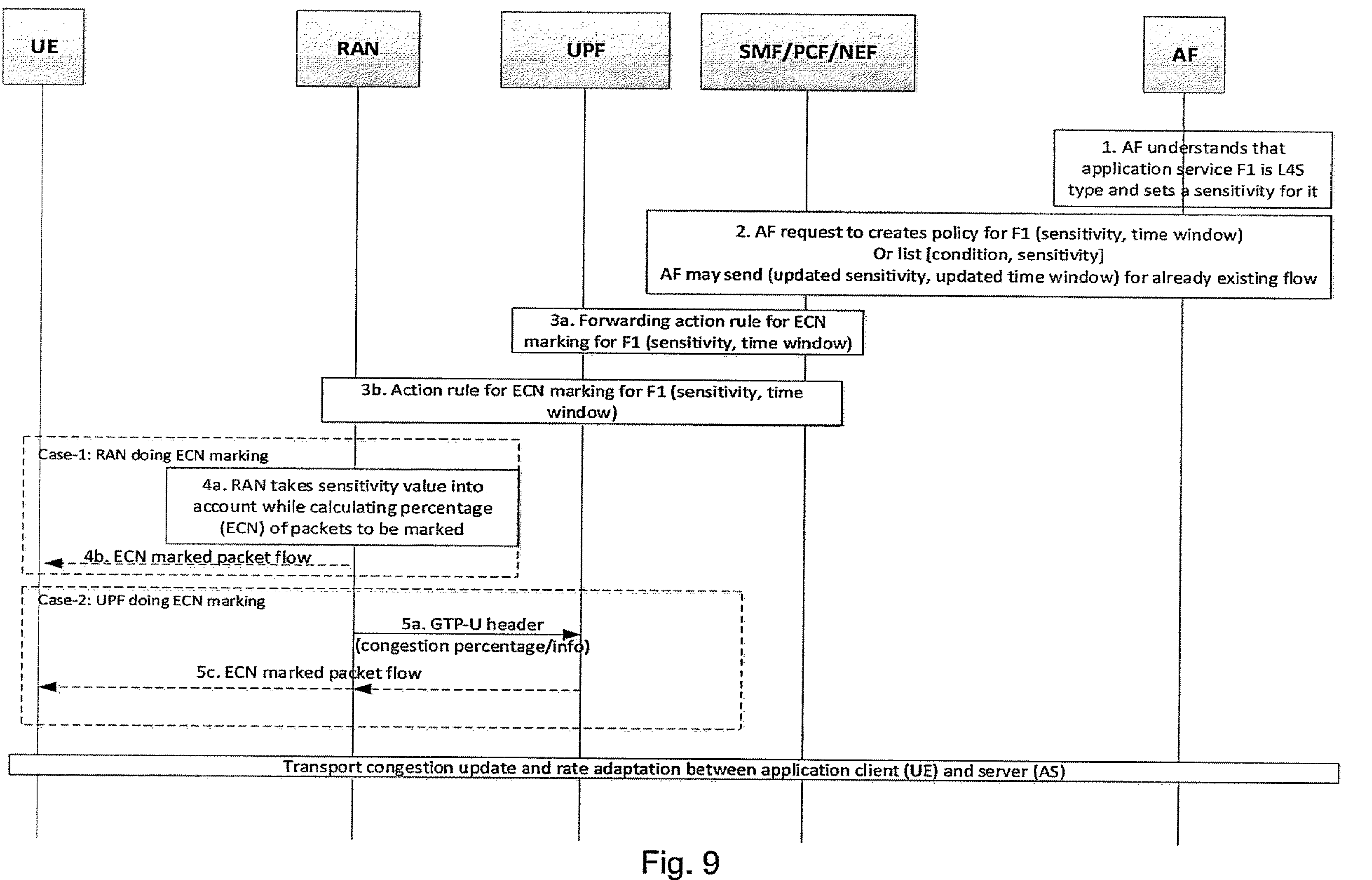
FIG. 9 shows a schematic diagram of signaling sequences according to some example embodiments.

FIG. 9 shows a schematic diagram of signaling sequences according to some example embodiments, and in particular illustrates processing for sensitivity indication by an AF.

In a step 1 of FIG. 9, according to some example embodiments, the AF understands/detects that some application types are of L4S type. Alternatively, the AF gets explicit information from application server (AS) that such an application/service is enabled with L4S (AS/application enabled ECT marking for such application traffic). By considering the type of application (e.g., application flow characteristics, number of such L4S type applications, etc.), the AF sets a sensitivity parameter for the application flow (e.g., sensitivity of F1 is 10% or 90%).

According to some example embodiments, the sensitivity indication can be sent as a list. For instance, the following sensitivity parameter information may be prepared:

{sensitivity X1, trigger condition: congestion level above Y1% or between Y1% and Y2%, time period, application characteristics, correlation ID (optional), UE ID(s) (optional, if the criteria applies to more than one UE)}, {sensitivity X2, trigger condition: congestion level above Y2% or between Y2% and Y3%, time period, application characteristics, correlation ID (optional), UE ID(s) (optional, if the criteria applies to more than one UE)}.

According to some example embodiments, the AF also provides a time-window to indicate to activate or apply the sensitivity value.

In a step 2 of FIG. 9, according to some example embodiments, the AF sends towards 5GC (SMF/PCF/network exposure function (NEF)) the sensitivity parameter and a time window (for which the sensitivity is valid) for the specific flow (it may use the policy authorization create/update procedure or QoS request procedure).

As an example embodiment, the AF may send the following sensitivity information parameters:

{sensitivity X1, trigger condition: congestion level above Y1% or between Y1% and Y2%, time period, application characteristics, correlation ID (optional), UE ID(s) (optional, if the criteria applies to more than one UE).

According to some example embodiments, for an already ongoing/existing flow, the AF may send an updated sensitivity and time window.

In a step 3 of FIG. 9, according to some example embodiments, the 5GC then sends/sets corresponding forwarding/marking rules in the RAN (step 3*b* of FIG. 9) and/or UPF (step 3*a* of FIG. 9), dependent on who is (is responsible for) doing the ECN markings. This includes that both may also do the marking.

In steps 4 and 5 of FIG. 9, according to some example embodiments, the RAN (steps 4*a* and 4*b* of FIG. 9)/UPF (steps 5*a* and 5*c* of FIG. 9) then take(s) the sensitivity parameter into account while marking the packets for the flow.

As an example embodiment, for 40% congestion level, the RAN/UPF may be marking X % of packets of a specific L4S QoS flow (e.g., F1). If the sensitivity parameter of/for F1 is 90%, then the 5GC node may increase the markings to 2*X % or 3*X % (so that the sender host/application shall reduce the data rate significantly). If the sensitivity of F1 is 10%, then the marking may be kept same as X % or reduced to 0.5*X %. The exact correlation between the sensitivity to the congestion level and marking percentage may be implementation specific.

According to some example embodiments, the ECN marked packets reach the UE (application client), and the UE (application client) informs the sender application (AS) about the congestion level (this implicitly took the sensitivity into account).

According to some example embodiments, advantageously, the sensitivity parameter (list) enables the AF to provide an additional L4S congestion mechanism in the networking based on the application considering dynamic changes with application characteristics, real life considerations (e.g. emergency news relay), end user considerations or demands, that cannot be accomplished with static L4S marking purely based on RAN congestion.

The above-described procedures and functions may be implemented by respective functional elements, processors, or the like, as described below.

In the foregoing description of the network entity, only the units that are relevant for understanding facets of the subject disclosure have been described using functional blocks. The network entity may comprise further units that are utilized for its respective operation. However, a description of these units is omitted in this specification. The arrangement of the functional blocks of the devices is not construed to limit the subject disclosure, and the functions may be performed by one block or further split into sub-blocks.

When in the foregoing description it is stated that the apparatus, i.e. network node or entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 10:
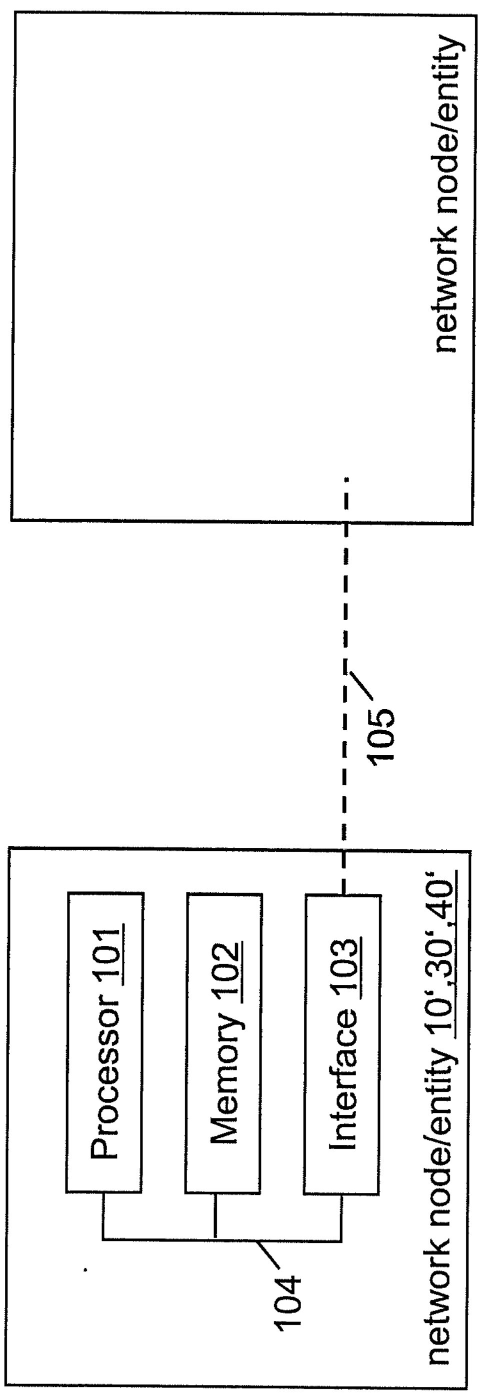
FIG. 10 is a block diagram alternatively illustrating apparatuses according to some example embodiments.

In FIG. 10, an alternative illustration of apparatuses according to some example embodiments is depicted. As indicated in FIG. 10, according to some example embodiments, the apparatus (network node or entity) 10' (corresponding to the network node or entity 10) comprises a processor 101, a memory 102 and an interface 103, which are connected by a bus 104 or the like. Further, according to some example embodiments, the apparatus (network node or entity) 30' (corresponding to the network node or entity 30) comprises a processor 101, a memory 102 and an interface 103, which are connected by a bus 104 (or the like). Further, according to some example embodiments, the apparatus (network node or entity) 40' (corresponding to the network node or entity 40) comprises a processor 101, a memory 102 and an interface 103, which are connected by a bus 104 or the like. The apparatuses may be connected via link 105 with other apparatuses, respectively, for example with other apparatuses out of example apparatuses 10', 30', 10' (corresponding to example apparatuses 10, 30, 40).

The processor 101 and/or the interface 103 may also include a modem or the like to facilitate communication over a (hardwire or wireless) link, respectively. The interface 103 may include a suitable transceiver coupled to one or more antennas or communication means for (hardwire or wireless) communications with the linked or connected device(s), respectively. The interface 103 is generally configured to communicate with at least one other apparatus, i.e. the interface thereof.

The memory 102 may store respective programs assumed to include program instructions or computer program code that, when executed by the respective processor, enables the respective electronic device or apparatus to operate in accordance with the various example embodiments of the subject disclosure.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to some example embodiments, an apparatus representing the network node or entity 10 comprises at least one processor 101, at least one memory 102 including computer program code, and at least one interface 103 configured for communication with at least another apparatus. The processor (i.e. the at least one processor 101, with the at least one memory 102 and the computer program code) is configured to perform deciding, for a first congestion notification marking enabled traffic flow, parameter information for modifying a congestion notification marking rate to be applied to said first congestion notification marking enabled traffic flow (thus the apparatus comprising corresponding means for deciding), and to perform transmitting, towards a network entity, a message including said parameter information (thus the apparatus comprising corresponding means for transmitting).

According to some example embodiments, an apparatus representing the network node or entity 30 comprises at least one processor 101, at least one memory 102 including computer program code, and at least one interface 103 configured for communication with at least another apparatus. The processor (i.e. the at least one processor 101, with the at least one memory 102 and the computer program code) is configured to perform receiving, from an application function entity, a first message including parameter information for modifying a congestion notification marking rate to be applied to a first congestion notification marking enabled traffic flow (thus the apparatus comprising corresponding means for receiving), and to perform transmitting, towards a congestion notification marking responsible entity, a second message including said parameter information (thus the apparatus comprising corresponding means for transmitting).

According to some example embodiments, an apparatus representing the network node or entity 40 comprises at least one processor 101, at least one memory 102 including computer program code, and at least one interface 103 configured for communication with at least another apparatus. The processor (i.e. the at least one processor 101, with the at least one memory 102 and the computer program code) is configured to perform receiving, from a network entity, a message including parameter information for modifying a congestion notification marking rate to be applied to a first congestion notification marking enabled traffic flow (thus the apparatus comprising corresponding means for receiving), to perform detecting packet queue delay information related to said first congestion notification marking enabled traffic flow indicative of a congestion level (thus the apparatus comprising corresponding means for detecting), and to perform determining said congestion notification marking rate to be applied to said first congestion notification marking enabled traffic flow based on said packet queue delay information, a general congestion notification marking rule, and said parameter information (thus the apparatus comprising corresponding means for determining).

For further details regarding the operability/functionality of the individual apparatuses, reference is made to the above description in connection with any one of FIGS. 1 to 9, respectively.

For the purpose of the subject disclosure as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the example embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g., the above-defined network entity or network register, or any one of their respective units/means) can be implemented as individual devices, units or means, but this does not exclude that they can be implemented in a distributed fashion throughout the system, as long as the functionality of the device, unit or means is preserved;
- an apparatus, like the user equipment and the network entity/network register, may be represented by a semiconductor chip, a chipset, or a (hardware) module comprising such chip or chipset; this, however, does not exclude the possibility that a functionality of an apparatus or module, instead of being hardware implemented, be implemented as software in a (software) module, such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the subject disclosure. Devices and means can be implemented as individual devices, but this does not exclude that they can be implemented in a distributed fashion throughout the system, as long as the functionality of the device is preserved. Such and similar principles are to be considered as known to a skilled person.

Software in the sense of the subject disclosure comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The subject disclosure also covers any combination of method steps and operations described above, and any conceivable combination of nodes, apparatuses, modules or elements described above, as long as the above-described concepts of methodology and structural arrangement are applicable.

In view of the above, there are provided measures for flow-specific congestion handling. By way of non-limiting and illustrative example, such measures may comprise deciding, for a first congestion notification marking enabled traffic flow, parameter information for modifying a congestion notification marking rate to be applied to said first congestion notification marking enabled traffic flow, and transmitting, towards a network entity, a message including said parameter information.

Even though the subject disclosure is described above with reference to its various example embodiments according to the accompanying drawings, it is to be understood that the subject disclosure is not restricted thereto. Rather, it is apparent to those skilled in the art that the subject disclosure can be modified in many ways without departing from the various example embodiments as disclosed herein.

LIST OF ACRONYMS AND ABBREVIATIONS

3GPP 3rd Generation Partnership Project
5G 5th Generation
5GC 5G core
5GS 5G system
5QI 5G QoS identifier
AF application function
AL-FEC application layer forward error correction
API application programming interface
AQM active queue management
AS application server
CE congestion experienced
DL downlink
ECN explicit congestion notification
ECT ECN capable transport
GPRS General Packet Radio System
GTP-U GPRS tunnelling protocol user plane
IP internet protocol
L4S low latency, low loss scalable throughput
NEF network exposure function
NG-RAN next generation radio access network
PCC policy and charging control
PCF policy control function
PDU packet data unit
PER packet error rate
PSA PDU session anchor
RTP real time protocol
QoS quality of service
SMF session management function
UE user equipment
UL uplink UPF user plane function
XR extended reality

The invention claimed is:

1. A user equipment (UE) apparatus, comprising:

at least one interface configured for communication with at least another apparatus;

at least one processor; and at least one memory storing instructions that, when executed with the at least one processor, cause the UE apparatus to perform:

deciding, for a first congestion notification marking enabled traffic flow, parameter information for modifying a congestion notification marking rate applied to said first congestion notification marking enabled traffic flow, wherein said first congestion notification marking enabled traffic flow comprises a traffic flow for which congestion notification marking is enabled based on an explicit configuration or indication of Explicit Congestion Notification (ECN) marking capability, wherein said parameter information includes values for modifying the congestion notification marking rate, wherein the values includes low, medium, or high, wherein the parameter information includes multiplier information, percentage information, and congestion level information;

transmitting, towards a network entity, a message including said parameter information, wherein said message includes validity time information associated with said parameter information, said validity time information being indicative of a validity time of said parameter information; and determining said parameter information based on:

an application type of an application causing said first congestion notification marking enabled traffic flow, wherein the application type comprises a real-time application;

a characteristic of said application causing said first congestion notification marking enabled traffic flow;

a number of congestion notification marking enabled traffic flows, including said first congestion notification marking enabled traffic flow existing at the same time;

an expected duration during which multiple congestion notification marking enabled traffic flows coexist;

a user selection in relation to said application causing said first congestion notification marking enabled traffic flow; and application layer forward error correction related information.

* * * * *